Jan. 24, 1928.
P. FISCHER
1,657,115
WAGON
Filed Aug. 3, 1927
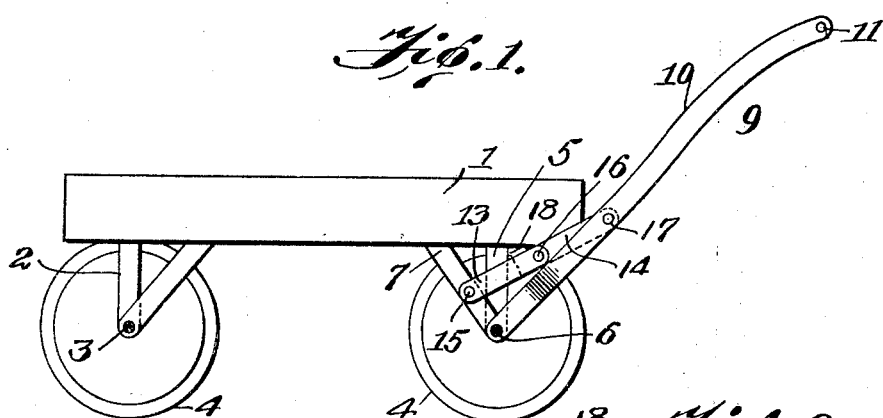
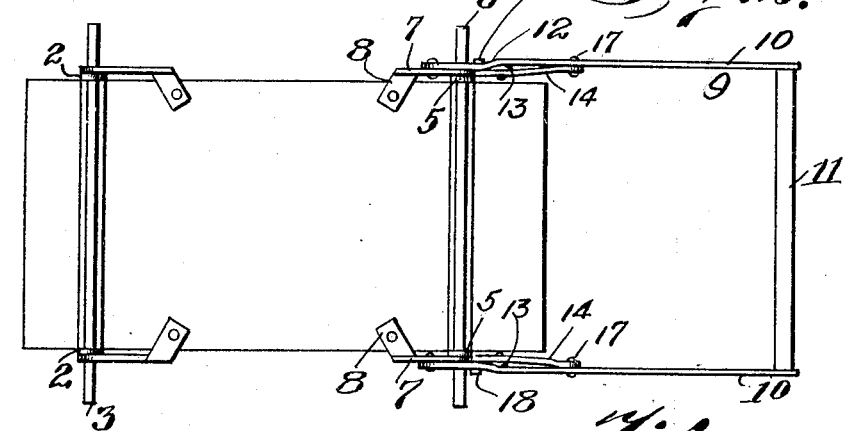
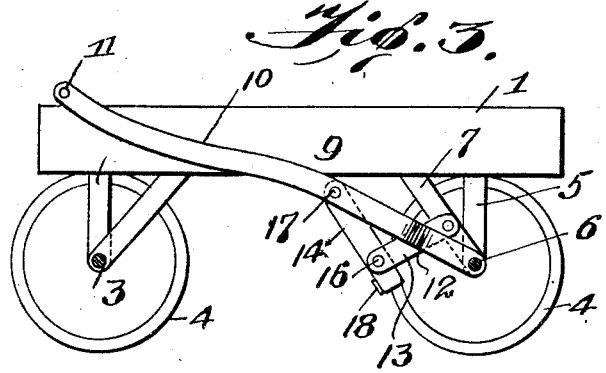
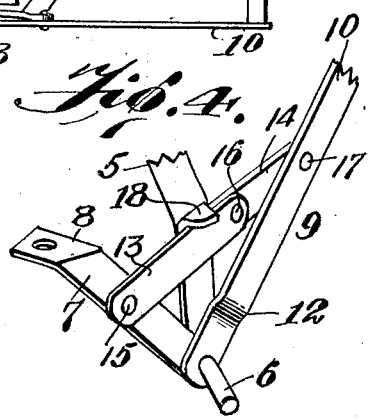
Inventor
Peter Fischer,
By E. E. Vrooman & Co.,
Attorneys.

Patented Jan. 24, 1928.

1,657,115

UNITED STATES PATENT OFFICE.

PETER FISCHER, OF CARROLL, IOWA.

WAGON.

Application filed August 3, 1927. Serial No. 210,226.

This invention relates to improvements in wagons.

The object of the invention is the construction of a simple and efficient handle-structure which enables the operator to move or fold the handle out of the way when the wagon or vehicle is not in use.

Another object of the invention is the construction of a simple and efficient wagon for use in conveying a clothes basket, as when the housewife wishes to take a loaded basket to the clothes line from a doorway of a dwelling.

With the foregoing and other objects in view, my invention comprises certain novel constructions, combinations and arrangements of parts as will be hereinafter fully described, illustrated in the accompanying drawings, and more particularly pointed out in the appended claims.

In the drawings:

Figure 1 is a view in side elevation of a wagon or a vehicle constructed in accordance with the present invention, while Figure 2 is a bottom plan view of the same.

Figure 3 is a view of a wagon or vehicle constructed in accordance with the present invention, showing the handle structure thereof in a "closed" or folded position.

Figure 4 is a fragmentary perspective view of the handle-structure.

Referring to the drawings by numerals, 1 designates the body of the wagon, to which is attached an inverted U-shaped bracket 2, upon which is journalled axle 3, and on axle 3 are the rear wheels 4. I use the term "wagon" in a broad sense, meaning a vehicle or conveyance that is adapted to carry a load such, for instance, as a clothes basket, full of clothes.

To the bottom of the body 1 and near its forward end, I secure an inverted U-shape bracket 5, and mounted on this bracket is forward axle 6. A pair of braces 7 is employed, and each brace 7 has axle 6 extending through its lower end, and its upper end is bent at right angles, as at 8, and secured against the body (Fig. 2). The handle 9 comprises a pair of side bars 10, connected at their outer ends by a grip 11. Each bar 10 is bent inwardly at 12 for the purpose hereinafter described. A pair of links 13 and 14 is at each side of the body 1. Link 13 is pivotally connected at 15 upon the central part of brace 7, and its other end is pivotally connected at 16 to link 14. Link 14 is connected at 17, to the bar 10. A right angled lug 18 is formed on the upper edge of link 14 and overhangs the top edge of link 13, so that when the handle 9 is in its open position, the lug 18 will be pressing on the link 13, thereby preventing the handle from swinging downwardly too far. In other words, the lugs 18 will keep the handle 9 in a proper "open" position when the wagon or vehicle is in use.

The bending of the bars at 12 give sufficient space for the links to work in between the braces 7 and bars 10.

It will be seen that when the wagon is not in use, the handle 9 can be laid down against the body 1, as clearly shown in Figure 3, whereby the handle is placed out of the way, between the front and rear ends of the body 1, which makes my wagon easy to store, because it will require less space than if the handle permanently projected beyond one end of the body.

The handle 9 is pivotally mounted on the forward axle with the handle pivotal limiting-links pivotally fastened to the side bars and the forward braces.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a device of the class described, the combination with a body, of an axle, means securing said axle to said body, braces on said axle and secured to said body, a handle pivotally mounted on said axle, and link means pivotally connected to said handle and to said braces.

2. In a device of the class described, the combination with a body, of an axle, means securing said axle to said body, braces having said axle extending through their lower ends, said braces secured flat against said body, a handle pivotally mounted at its lower end on said axle, and pivot-limiting links pivotally connected to said handle and said braces.

3. In an apparatus of the class described, the combination with a body, of an axle, means securing said axle to said body, braces mounted at their lower ends upon said axle, said braces having their upper ends bent at right angles and positioned against the bottom of said body, a handle including side bars, said side bars pivotally mounted at their lower ends upon said axle, each side bar bent inwardly near its lower end, a pair of links at each side of said body, means pivotally connecting the links in each pair, one of the links in each pair provided with an overhanging lug adapted to engage the other link in the pair for limiting pivotal movement of the links, and means connecting the links in each pair with a side bar and with a brace, substantially as shown and described.

4. In a device of the class described, the combination with a body, of an axle, means securing said axle to said body, a handle including side bars, each side bar bent inwardly near its lower end and pivotally mounted on said axle, braces secured to said body and on the axle between said side bars, and link means pivotally connected to said braces and to said side bars near said inwardly bent portions of the side bars.

In testimony whereof I hereunto affix my signature.

PETER FISCHER.